Nov. 29, 1960 C. J. CISLO 2,962,297
PNEUMATIC SUSPENSION LIFT CONTROL
Filed July 28, 1958

INVENTOR.
Casimer J. Cislo
BY
W. S. Pettigrew
ATTORNEY

United States Patent Office 2,962,297
Patented Nov. 29, 1960

2,962,297

PNEUMATIC SUSPENSION LIFT CONTROL

Casimer J. Cislo, Detroit, Mich., assignor to General Motors Corporation, Detroit, Mich., a corporation of Delaware Filed July 28, 1958, Ser. No. 751,331

14 Claims. (Cl. 280—124)

This invention relates to pneumatic suspension for vehicles and more particularly to control apparatus therefor.

An object of the present invention is to provide an improved pneumatic suspension system for vehicles.

Another object is to provide improved control apparatus for pneumatic vehicle suspension.

A further object is to provide a pneumatic vehicle suspension system including control apparatus adapted to permit selection of two different road clearance heights.

Still a further object is to provide in a pneumatic suspension system of the type having a high pressure circuit and an exhaust circuit, a leveling valve assembly which is operative responsive to alteration of the fluid flow circuit to establish either a normal vehicle trim height or a temporary extended trim height.

A still further object is to provide in an arrangement of the type described, a leveling valve assembly which is adapted upon introduction of high pressure air into the exhaust circuit therefor to raise the vehicle to a temporary extended trim height.

Yet a further object is to provide a structure of the stated character which is capable of establishing an extended trim height at any desired level between the normal trim height and the maximum rebound position of the suspension structure.

Yet another object is to provide an apparatus of the type described including remote control means for effecting the desired change in fluid flow circuit.

Figure 1:
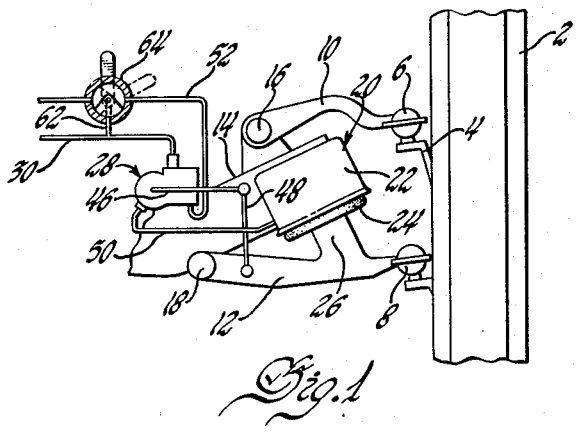
Figure 2:
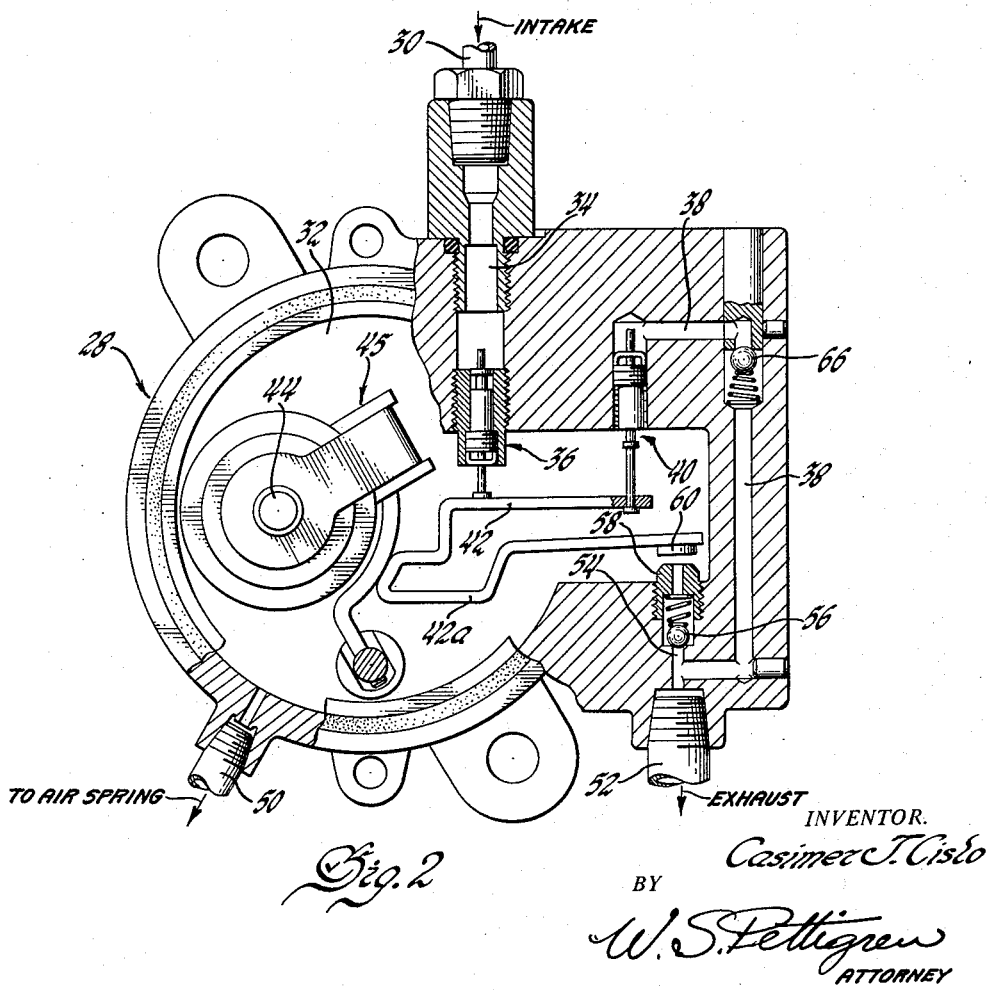

These and other objects, advantages and features of the invention will become more fully apparent as reference is had to the accompanying specification and drawing wherein:

Fig. 1 is a schematic view showing the structural and fluid circuit relation of the invention with respect to an air spring assembly for one wheel of a four-wheel vehicle; and Fig. 2 is an enlarged elevational view, partly in section, and with parts broken away, illustrating the structure and arrangement of the invention.

In Fig. 1 there is illustrated a portion of a vehicle suspension in which a dirigible wheel 2 is mounted for rotation on a wheel knuckle element 4, the upper and lower ends of which are connected by spherical joints 6 and 8 to the outer ends of a pair of vertically spaced upper and lower wishbone control arms 10 and 12, respectively. The inner ends of arms 10 and 12 are pivoted to a vehicle frame member 14 on generally longitudinally extending axes 16 and 18. Frame 14 is resiliently suspended with respect to wheel 2 by means of an air spring assembly 20. Assembly 20 includes an inverted cup-shaped cylinder 22, a flexible bellows 24, and a piston element 26 rigidly supported on lower arm 12. The elastic medium, provided by air confined in spring assembly 20, is introduced and exhausted from spring 20 by a leveling valve assembly 28 in accordance with variation in vertical clearance between frame 14 and the ground upon which wheel 2 rests so that the frame 14 is maintained at a constant predetermined trim height.

As seen best in Fig. 2, air supplied from a source of high pressure, not shown, is delivered through the vehicle suspension system high pressure circuit 30 to the interior cavity 32 of leveling valve 28 via a port 34 in which is disposed a normally closed push-type plunger valve assembly 36. Conversely, air exhausted from the spring emerges from the interior 32 of valve 28 via passage 38 in which is disposed a normally closed pull-type plunger valve assembly 40. Valves 36 and 40 are actuated by an arm 42 which is connected to a rocking shaft 44 journaled in the housing of valve 28 by an angularly yieldable connection 45 which normally assures concurrent angular movement but allows relative angular movement if angular movement of shaft 44 exceeds the mechanical limit of arm 42. Rocking shaft 44, in turn, is connected at one end of a lever 46 disposed externally of valve 28 (Fig. 1), while the opposite end of lever 46 is connected to lower control arm 12 by a drop link 48. It will now be seen that descending movement of frame 14 will cause rotation of shaft 44 in a counterclockwise direction imparting similar angular movement to arm 42 which, in turn, displaces intake valve 36 upwardly to open position admitting high pressure air from circuit 30 into cavity 32 from which it passes through conduit 50 into air spring 20 until the volume of air therein has been increased sufficiently to restore the frame level to a height at which arm 42 is returned clockwise to a position disengaging valve 36 whereupon further movement of air from circuit 30 is blocked. Conversely, when the vertical height of frame 14 rises above the normal level, lever 46 is caused to rotate clockwise imparting similar clockwise movement to arm 42 which pulls exhaust valve 40 to open position. Air in spring 20 then emerges through conduit 50 into cavity 32 and passes through valve 40 to atmosphere via passage 38 and exhaust circuit 52.

Inasmuch as the normal trim height of air suspended vehicles on occasion is insufficient to permit negotiation of abnormal terrain, it is desirable that means be provided for temporarily increasing the normal vehicle road clearance or trim height. While it has been proposed in the past to accomplish this objective by introducing high pressure air directly into the springs, and thus inflate the vehicle spring to the maximum rebound position, this expedient severely limits the usefulness of the vehicle and requires extreme care in operation in order to avoid demage to the springs and other parts of the suspension such as the hydraulic shock absorbers. In order to provide a second or extended trim height position while allowing vehicle operation without the risk of damage to the suspension, in accordance with the present invention the exhaust passage 38 of valve 28 is provided with a branch passage 54 in which is disposed a normally closed check valve assembly 56. Beyond check valve 56, passage 54 communicates with the interior of valve 28 through an orifice 58. Cooperating with orifice 58 is a secondary arm 42a which in the illustrated embodiment is formed integrally with arm 42. At its terminal extremity, arm 42a has formed thereon a downwardly facing closure pad 60 which is adapted for abutting engagement with orifice 58. During normal operation of valve assembly 28, arm 42a moves with arm 42, but is inoperative insofar as affecting the leveling function of the valve assembly. However, as seen in Fig. 1, high pressure circuit 30 and exhaust circuit 52 are connected by a conduit 62. Disposed in circuit 52 and connected to conduit 62 is a control valve 64. Valve 64 has a normal position shown in solid lines wherein communication between circuits 30 and 52 is prevented, and a second position permitting flow of high pressure air into the portion of exhaust circuit 52 between valve 64 and leveling valve 28 while blocking the remainder of the exhaust circuit. Upon movement of valve 64 to the position shown in dotted lines, high pressure air enters exhaust circuit 52 unseating check valve 56 in passage 54 and emerges into cavity 32 through orifice 58. Although high pressure air is simultaneously directed into passage 38, a second check valve 66 prevents passage of high pressure air through exhaust valve 40. As a result, high pressure air is allowed to enter spring 20 until the frame 14 has risen sufficiently to cause rotation of shaft 44 in a clockwise direction sufficient to cause seating engagement between closure pad 60 of arm 42a and orifice 58 of passage 54, at which time further entrance of air into spring 20 ceases and the vehicle thereafter remains at the extended trim height. It will be observed that even though exhaust valve 40 is pulled to an open position by arm 42 when arm 42a occupies a position closing orifice 58, air in cavity 32 cannot exhaust through passage 38 due to the fact that air pressure in cavity 32 is equal to the air pressure in spring 22 which is less than the high pressure circuit pressure present in passage 38. However, when the vehicle operator desires to return the vehicle to normal road clearance, manipulation of control 64 back to the normal position shown in solid lines automatically restores the exhaust circuit 52 to its normal function, allowing high pressure air therein to exhaust to atmosphere whereupon the pressure differential at ball check 66 reverses, and air in the spring is afforded an exit to atmosphere through open exhaust valve 40 until the trim height of the vehicle is restored to a position causing arm 42 to return to the normal horizontal position shown in Fig. 2. Thereafter, the trim height of the vehicle is again exclusively controlled by operation of valves 36 and 40.

It should be particularly noted that with the present invention the lift position or extended trim height is determined by the angular position of arm 42a when closure 60 seats on orifice 58. Therefore, any desired extended trim height between normal trim and the maximum rebound position of the suspension may be had merely by initially adjusting the closing position of closure 60. By proper selection, an extended trim position may be had which not only provides increased clearance, but also permits reasonable vertical ride motion within the normal mechanical limits of the suspension.

Although the invention has been shown in relation to but one spring, it is to be understood that it is intended to apply to all four springs of a normal four-wheeled vehicle. It is also to be understood that the cross-flow control device 64 is preferably located at a point convenient to the vehicle operator as for example on the vehicle instrument panel or adjacent thereto.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In combination, an air spring having two relatively displaceable members, an air intake circuit, an air exhaust circuit, control means for selectively connecting said circuits in independent and communicating relation respectively, a leveling valve assembly connected to said circuits between said control means and said spring, said assembly including intake and exhaust circuit closures actuated responsive to variation in displacement of said members so as to maintain said spring displacement at a predetermined distance, additional closure means associated with said exhaust circuit movable with said closures, said additional closure means operating to establish an extended spring clearance when said intake and exhaust circuits are in interconnected relation, and means responsive to introduction of intake air into said exhaust circuit effective to prevent movement of intake air past said exhaust closure.

2. In combination with an air spring disposed between the sprung and unsprung mass of a vehicle, an air intake circuit, an air exhaust circuit, control means for selectively maintaining said circuits in independent operating relation or placing the same in communicating relation, a leveling valve assembly connected to said circuits between said control means and said air spring, said assembly including movable intake and exhaust closures, a closure operating arm actuated responsive to variation in displacement of said sprung and unsprung mass above and below a predetermined clearance, additional closure means associated with said exhaust circuit, an operating arm for said additional closure means movable with said first mentioned arm, said last mentioned closure means and arm operating to allow intake of air until the clearance between the sprung and unsprung mass reaches a predetermined level greater than said first mentioned clearance when said intake and exhaust circuits are in interconnected relation, and means responsive to introduction of intake air into said exhaust circuit effective to prevent movement of intake air past said exhaust closure.

3. In a device of the class described, a leveling valve assembly comprising a housing having a main cavity, a fluid intake passage and a fluid exhaust passage communicating with said cavity, closure means associated with each of said passages, an operating arm mounted in said cavity adapted to displace said intake closure upon movement in one direction and to displace said exhaust closure upon movement in the opposite direction, an alternate passage associated with said exhaust passage and communicating with said main cavity, and a closure member adapted to close said alternate passage only upon movement of said arm in the direction displacing said exhaust closure.

4. In a device of the class described, a leveling valve assembly comprising a housing having a main cavity, a fluid intake passage and a fluid exhaust passage communicating with said cavity, oppositely biased closure means associated with each of said passages, an operating arm mounted in said cavity adapted to displace said intake closure upon movement in one direction and to displace said exhaust closure upon movement in the opposite direction, an alternate passage associated with said exhaust passage and communicating with said main cavity, and a closure member adapted to close said alternate passage only upon movement of said arm in the direction displacing said exhaust closure.

5. In a device of the class described, a leveling valve assembly comprising a housing having a main cavity, a fluid intake passage and a fluid exhaust passage communicating with said cavity, oppositely biased closure means associated with each of said passages, an operating arm swingably mounted in said cavity adapted to displace said intake closure upon movement in one direction and to displace said exhaust closure upon movement in the opposite direction, an alternate passage associated with said exhaust passage and communicating with said main cavity, and a closure member movable with said operating arm adapted to close said alternate passage upon movement of said arm in the direction displacing said exhaust closure.

6. In a device of the class described, a leveling valve assembly comprising a housing having a main cavity, a fluid intake passage and a fluid exhaust passage communicating with said cavity, oppositely biased closure means associated with each of said passages, an impositively driven operating arm swingably mounted in said cavity adapted to displace said intake closure upon movement in one direction and to displace said exhaust closure upon movement in the opposite direction, an alternate passage associated with said exhaust passage and communicating with said main cavity, and a closure member on said operating arm adapted to close said alternate passage upon movement of said arm in the direction displacing said exhaust closure.

7. In a device of the class described, a leveling valve assembly comprising a housing having a main cavity, a fluid intake passage and a fluid exhaust passage communicating with said cavity, oppositely biased closure means associated with each of said passages, an impositively driven operating arm swingably mounted in said cavity adapted to displace said intake closure upon movement in one direction and to displace said exhaust closure upon movement in the opposite direction, an alternate passage associated with said exhaust passage and communicating with said main cavity, and a yieldable closure member on said arm adapted to close said alternate passage upon movement of said arm a predetermined distance in the direction displacing said exhaust closure.

8. In a device of the class described, a leveling valve assembly comprising a housing having a main cavity, a fluid intake passage and a fluid exhaust passage communicating with said cavity, closure means associated with each of said passages, an impositively driven operating arm mounted in said cavity adapted to displace said intake and exhaust closures, respectively, upon movement in opposite directions from a predetermined neutral position, an alternate passage associated with said exhaust passage and communicating with said main cavity, and an impositively driven closure member associated with said operating arm adapted to close said alternate passage upon movement of said arm a predetermined distance in the direction displacing said exhaust closure.

9. In a device of the class described, a leveling valve assembly comprising a housing having a main cavity, a fluid intake passage and a fluid exhaust passage communicating with said cavity, closure means associated wtih each of said passages, an operating arm mounted in said cavity adapted to displace said intake closure upon movement in one direction and to displace said exhaust closure upon movement in the opposite direction, an alternate passage branching from said exhaust passage and communicating with said main cavity, a closure member adapted to close said alternate passage upon movement of said arm in the direction displacing said exhaust closure, a check valve preventing fluid flow through said exhaust passage to said cavity, and a check valve preventing fluid flow from said cavity to said alternate passage.

10. In a device of the class described, a leveling valve assembly comprising a housing having a main cavity, a fluid intake passage and a fluid exhaust passage communicating with said cavity, closure means associated with each of said passages, an operating arm mounted in said cavity adapted to displace said intake closure upon movement in one direction and to displace said exhaust closure upon movement in the opposite direction, an alternate passage branching from said exhaust passage and communicating with said main cavity, a closure member on said arm adapted to close said alternate passage upon movement of said arm in the direction displacing said exhaust closure, a check valve preventing fluid flow through said exhaust passage to said cavity, and a check valve preventing fluid flow from said cavity to said alternate passage.

11. A leveling valve assembly comprising a housing having a main cavity, an intake passage having a port opening into said cavity, a branched air exhaust passage having a pair of ports opening into said cavity, a push-type valve assembly mounted in said intake port, a pull-type valve assembly mounted in one of the ports associated with said exhaust passage, an impositively driven rockable operating arm mounted in said cavity for actuating said valve, a secondary arm movable with said operating arm, valve means associated with said secondary arm adapted to open and close the other of said ports associated with said exhaust passage, and check valve means in said last mentioned port preventing air flow therethrough from said cavity when said valve means is in open position.

12. A leveling valve assembly comprising a housing having a main cavity, an intake passage having a port opening into said cavity, a branched air exhaust passage having a pair of ports opening into said cavity, a push-type valve assembly mounted in said intake port, a pull-type valve assembly mounted in one of the ports associated with said exhaust passage, an impositively driven rockable operating arm mounted in said cavity for actuating said valve, a secondary arm integral with and spaced from said operating arm, valve means associated with said secondary arm adapted to open and close the other of said ports associated with said exhaust passage, and check valve means in said last mentioned port preventing air flow therethrough from said cavity when said valve means is in open position.

13. In an air spring suspension system of the type having an intake and an exhaust circuit and including control means for placing said circuits in independent and communicating relation respectively, a leveling valve assembly disposed between said circuits and said spring operative to establish and maintain a normal vehicle height clearance when said circuits are in independent relation and to provide an extended height clearance when said circuits are in communicating relation, said assembly comprising a housing having a normal intake passage, a normal exhaust passage, and a secondary intake passage, said secondary intake passage being arranged in communication with said normal exhaust passage, mechanically operated closures associated with each of said passages, and a pair of oppositely biased pressure responsive closures disposed respectively in said normal exhaust passage and said secondary intake passage.

14. The invention claimed in claim 13 wherein said control means operates to prevent exhausting of air from said exhaust circuit to atmosphere when said exhaust and intake circuits are in communicating relation.

References Cited in the file of this patent

UNITED STATES PATENTS 2,844,386   Pribonic _____ July 22, 1958